United States Patent
Husted et al.

(10) Patent No.: US 9,065,594 B1
(45) Date of Patent: Jun. 23, 2015

(54) PROFILE-BASED PACKET RATE ADAPTATION FOR WIRELESS SYSTEMS

(75) Inventors: Paul J. Husted, San Jose, CA (US); Douglas J. Kogan, Sandy, UT (US); Praveen Dua, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 747 days.

(21) Appl. No.: 12/719,978

(22) Filed: Mar. 9, 2010

Related U.S. Application Data

(60) Provisional application No. 61/245,158, filed on Sep. 23, 2009.

(51) Int. Cl.
*H04L 1/00* (2006.01)

(52) U.S. Cl.
CPC .................................. *H04L 1/0002* (2013.01)

(58) Field of Classification Search
CPC .............................. H04L 1/0002; Y02B 60/50
USPC ................. 370/252, 318; 714/100, 1, 48, 746
See application file for complete search history.

(56) References Cited

U.S. PATENT DOCUMENTS

| | | | |
|---|---|---|---|
| 4,644,562 A | 2/1987 | Kavehrad et al. | |
| 5,241,567 A | 8/1993 | Shimakata | |
| 5,301,210 A | 4/1994 | Vandamme et al. | |
| 5,550,506 A | 8/1996 | Tsumura | |
| 5,928,379 A | 7/1999 | Hattori | |
| 6,018,544 A * | 1/2000 | Kotzin et al. | 375/148 |
| 6,859,504 B1 | 2/2005 | Kowalski | |
| 6,904,098 B1 | 6/2005 | Isaksen et al. | |
| 7,756,082 B1 * | 7/2010 | Dhamdhere | 370/331 |
| 7,970,920 B1 * | 6/2011 | Dinan | 709/230 |
| 8,401,120 B1 | 3/2013 | Ozgur | |
| 8,401,121 B1 | 3/2013 | Ozgur | |
| 8,885,776 B2 | 11/2014 | Ozgur | |
| 2002/0118665 A1 * | 8/2002 | Cleveland et al. | 370/342 |
| 2003/0045333 A1 * | 3/2003 | Kimata et al. | 455/574 |
| 2003/0058036 A1 | 3/2003 | Stillman et al. | |
| 2003/0083834 A1 | 5/2003 | Little et al. | |
| 2005/0008101 A1 | 1/2005 | Kazi et al. | |
| 2005/0039103 A1 * | 2/2005 | Azenko et al. | 714/776 |
| 2005/0097409 A1 * | 5/2005 | Shin et al. | 714/704 |
| 2005/0111485 A1 * | 5/2005 | Bruckmann et al. | 370/465 |
| 2009/0130989 A1 | 5/2009 | Rousu et al. | |

(Continued)

OTHER PUBLICATIONS

U.S. Appl. No. 12/779,208, filed May 13, 2010, Ozgur, Soner.

(Continued)

*Primary Examiner* — Luat Phung
(74) *Attorney, Agent, or Firm* — DeLizio Law, PLLC

(57) ABSTRACT

Bluetooth file transfers using FTP do not provide upper-layer reliability checking and rely on the Bluetooth device physical layer providing reliable data to upper layers of a Bluetooth stack. However, reliability checks implemented by the physical layer are typically not very robust and in some cases may fail to detect errors, thus may provide corrupted data to the upper layers for further processing and may result in data corruption/transfer failure. Non-FTP Bluetooth file transfers are typically more robust when it comes to reliability checking because of upper layer reliability checks. Functionality can be implemented to vary packet transmission parameters depending on a Bluetooth profile implemented on a communication link. A packet error rate of received packets can be compared against a different set of thresholds depending on whether the Bluetooth profile is an FTP profile. Appropriate values of packet transmission parameters can be selected based on the above comparison.

33 Claims, 6 Drawing Sheets

(56) References Cited

U.S. PATENT DOCUMENTS

| | | |
|---|---|---|
| 2009/0147732 A1* | 6/2009 | Tsao ............................ 370/328 |
| 2010/0067401 A1* | 3/2010 | Medvedev et al. ............ 370/253 |
| 2011/0289379 A1* | 11/2011 | Uhlemann .................... 714/762 |
| 2013/0156132 A1 | 6/2013 | Ozgur |
| 2013/0163655 A1 | 6/2013 | Ozgur |

OTHER PUBLICATIONS

U.S. Appl. No. 12/779,209, filed May 13, 2010, Ozgur, Soner.

"Bluetooth Core Specification v3.0 + HS—Procedures for Flow Control and Retransmission", vol. 3, Part A, Section 8 http://www.bluetooth.com/Engilsh/Technology/Building/Pages/Specification.aspx Obtained from internet on Dec. 28, 2010, pp. 130-176.

"U.S. Appl. No. 12/779,208 Office Action", Jul. 13, 2012, 7 pages.

"U.S. Appl. No. 12/779,209 Office Action", Jul. 5, 2012, 7 pages.

"U.S. Appl. No. 13/770,491 Office Action", Jan. 2, 2014, 11 Pages.

Co-pending U.S. Appl. No. 13/769,032, filed Feb. 15, 2013, pp. 46.

Co-pending U.S. Appl. No. 13/770,491, filed Feb. 19, 2013, pp. 37.

"U.S. Appl. No. 13/769,032 Ex Parte Quayle Action", Jun. 21, 2013, 5 pages.

\* cited by examiner

US 9,065,594 B1

PROFILE-BASED PACKET RATE ADAPTATION FOR WIRELESS SYSTEMS

RELATED APPLICATION

This application claims the priority benefit of U.S. Provisional Application Ser. No. 61/245,158 filed Sep. 23, 2009.

BACKGROUND

Embodiments of the inventive subject matter generally relate to the field of wireless communication and, more particularly, to a profile-based packet rate adaptation for wireless systems.

Wireless devices are often used for file transfers. Bluetooth® file transfers, typically known as File Transfer Profile (FTP) transfers, are commonly used to exchange data files, business card, pictures, sound files, etc. Bluetooth FTP file transfers use an Object Exchange (OBEX) protocol on top of a radio frequency communications (RFCOMM) serial cable emulation protocol. The Bluetooth FTP file transfers used in conjunction with the OBEX/RFCOMM communication protocol typically do not provide a high level of data reliability checking.

SUMMARY

Various embodiments for profile-based packet rate adaptation for wireless systems are disclosed. In one embodiment, it is determined whether a wireless communication profile associated with a plurality of packets received at a first wireless network device, from a second wireless network device, is a first wireless communication profile. A packet error rate associated with the plurality of packets received at the first wireless network device is calculated. The packet error rate is compared with a first set of packet error rate thresholds associated with the first wireless communication profile, if it is determined that the wireless communication profile associated with the plurality of packets is the first wireless communication profile. It is determined whether one or more packet transmission parameters associated with additional packets to be received at the first wireless network device from the second wireless network device should be changed, based on results of said comparing the packet error rate with the first set of packet error rate thresholds.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
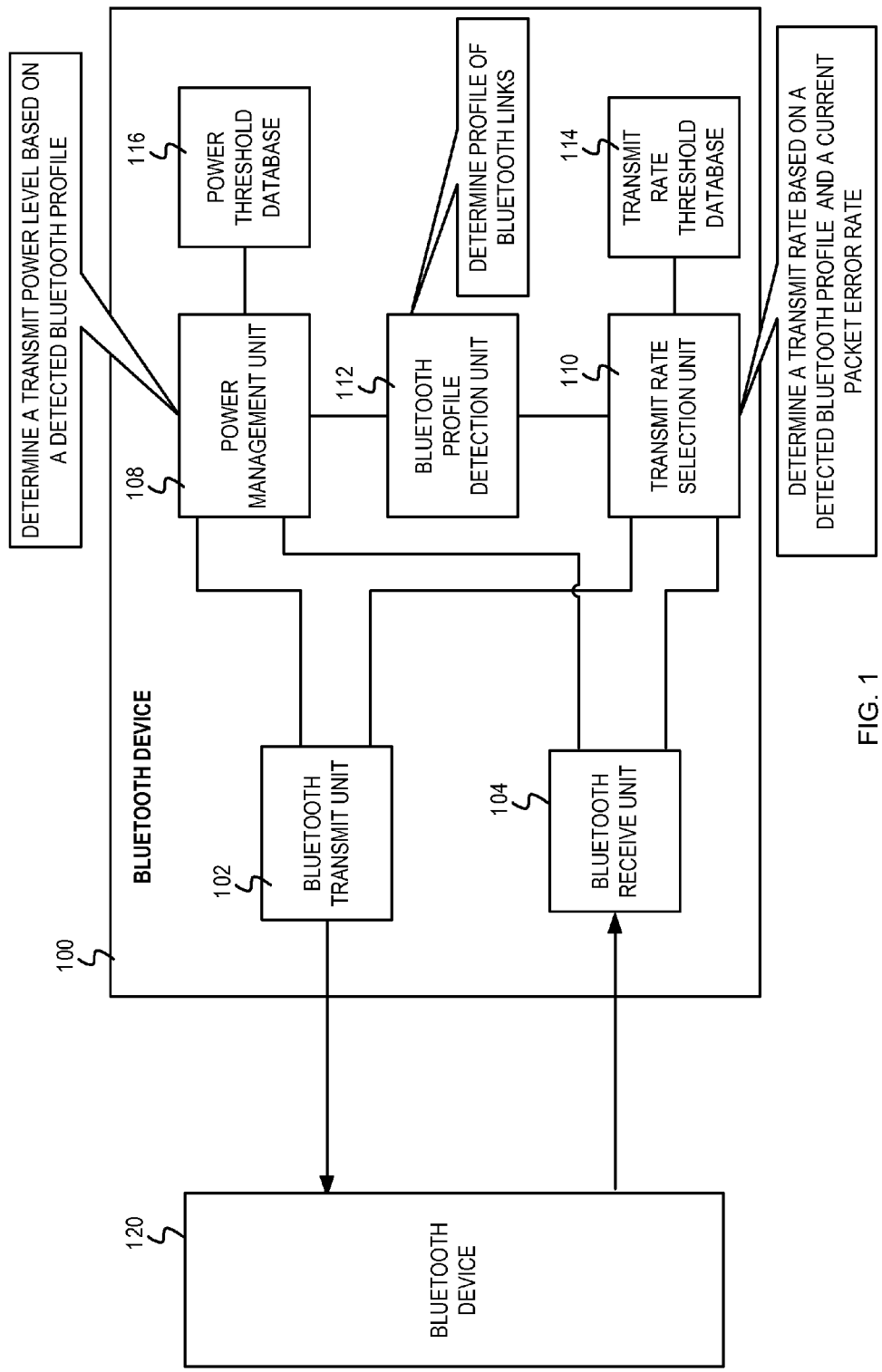
FIG. 1 is an example block diagram illustrating operations for packet transmit rate selection based on a Bluetooth profile.

The description that follows includes exemplary systems, methods, techniques, instruction sequences, and computer program products that embody techniques of the present inventive subject matter. However, it is understood that the described embodiments may be practiced without these specific details. For instance, although examples refer to a profile-based adaptation of transmit parameters (e.g., transmit rate, transmit power) for Bluetooth devices, in other embodiments transmit parameters may be varied for other wireless standards and devices, e.g., WLAN, WiMAX, ZigBee®, Wireless USB devices, etc. In other instances, well-known instruction instances, protocols, structures, and techniques have not been shown in detail in order not to obfuscate the description.

OBEX/RFCOMM communication protocol, typically used to implement Bluetooth FTP file transfers, is a relatively simple protocol and does not provide upper-layer reliability checking. The Bluetooth file transfers using FTP rely on the Bluetooth device physical layer (PHY layer) providing reliable data to upper layers of a Bluetooth stack. Reliability checking in the PHY layer is provided by a 16-bit cyclic redundancy check (CRC) code, transmitted at the end of each baseband packet. The data is assumed to be uncorrupted if the CRC computed by a receiving Bluetooth device equals the CRC transmitted by a transmitting Bluetooth device. Exclusive reliance on the PHY layer to provide reliability checking can result in corrupted data being provided to the receiving Bluetooth device's firmware and other applications for further processing. For example, the 16-bit CRC data reliability check may fail for very large transfers because of a false-positive result on a CRC checksum. For example, if two complementary bit errors are more than 16-bits apart, a false-positive match on the 16-bit CRC may be produced, for a sufficiently long data stream. Also, the 16-bit CRC data reliability check in the PHY layer may not provide enough protection against strong interference from other wireless devices (e.g., other Bluetooth devices, WLAN devices, mobile phones, etc). False positive results on the CRC checksum, as a result of the length of an L2CAP fragment of the file transfer being incorrectly decoded, an incorrect section of the packet being read as the CRC checksum, data corruption in bits intended for upper layer protocols, etc., can lead to an aborted or incomplete file transfer. In contrast, non-FTP Bluetooth profiles (e.g., A2DP, PAN, etc) have upper layer reliability checks that provide additional levels of protection so that corrupted data that erroneously passes the CRC data reliability check at the PHY layer is discarded at the upper layers.

Functionality can be implemented to vary packet transmission parameters such as packet transmit rate, transmit power level, etc. depending on whether or not the Bluetooth profile of a communication link is an FTP profile. The receiving Bluetooth device can calculate a packet error rate, a signal strength indicator, and other such performance indicators and compare the performance indicators against a set of thresholds. The receiving Bluetooth device can compare current values of the performance indicators against a first set of thresholds if the Bluetooth profile is an FTP profile. The receiving Bluetooth device can compare the current values of the performance indicators against a second set of thresholds if the Bluetooth profile is not an FTP profile. By choosing an appropriate set of the packet transmission parameters based on the Bluetooth profile, packet errors and performance degradation due to exclusive use of unreliable CRC checksums can be mitigated in communication links that implement the FTP profile.

FIG. 1 is an example block diagram illustrating operations for packet transmit rate selection based on a Bluetooth profile. FIG. 1 depicts Bluetooth devices 100 and 120. The Bluetooth device 120 and the Bluetooth device 100 establish a communication link to exchange information. The Bluetooth device 100 comprises a Bluetooth transmit unit 102 and a Bluetooth receive unit 104. The Bluetooth device 100 also comprises a power management unit 108, a Bluetooth profile detection unit 112, a transmit rate selection unit 110, a power threshold database 116, and a transmit rate threshold database 114. The Bluetooth receive unit 104 is connected to the power management unit 108 and the transmit rate selection unit 110. Likewise, the Bluetooth transmit unit 102 is connected to the power management unit 108 and the transmit rate selection unit 110. Also, the Bluetooth profile detection unit 112 provides inputs to the power management unit 108 and the transmit rate selection unit 110. The power management unit 108 is coupled to the power threshold database 116. The transmit rate selection unit 110 is coupled to the transmit rate threshold database 114.

The Bluetooth receive unit 104 receives a Bluetooth signal comprising a Bluetooth packet. The Bluetooth receive unit 104 may comprise functionality to amplify, down convert, and filter the Bluetooth signal, extract the Bluetooth packet from the Bluetooth signal, etc. Additionally, the Bluetooth receive unit 104 may implement functionality for calculating performance indicators of the Bluetooth packet such as a packet error rate, received signal strength indicator (RSSI) of the Bluetooth signal, signal to noise ratio (SNR), etc. The Bluetooth receive unit 104 may calculate the packet error rate (PER) by determining a percentage of packets or a number of packets that have not been correctly received. In some examples, the Bluetooth packet comprises a checksum value (e.g., a 16-bit CRC value) calculated at a transmitting Bluetooth device 120. The Bluetooth receive unit 104 may decode data in the Bluetooth packet, calculate a checksum value of the decoded data, and compare the checksum value of the decoded data with the checksum value determined at the transmitter. If the checksum values do not match, the Bluetooth receive unit 104 may indicate that the data integrity of the Bluetooth packet has been compromised. Additionally, the Bluetooth receive unit 104 may also calculate an RSSI of the Bluetooth signal ("Bluetooth RSSI"). The Bluetooth receive unit 104 may determine the Bluetooth RSSI as one of an average RSSI of packets received by the Bluetooth device 100 over a pre-defined time interval, an average RSSI of a pre-defined number of previously received packets, a minimum RSSI of a pre-defined number of previously received packets, etc.

The Bluetooth receive unit 104 sends the performance indicators to the transmit selection unit 110 and the power management unit 108. The Bluetooth profile detection unit 112 determines the profile of the communication link on which the Bluetooth packet was received. The Bluetooth profile describes Bluetooth protocols, which are used by the transmitting and the receiving Bluetooth devices to exchange information over the communication link. Some examples of Bluetooth profiles are file transfer profile (FTP), personal area networking (PAN) profile, advanced audio distribution profile (A2DP), etc. In one implementation, the Bluetooth profile detection unit 112 may receive a notification of the Bluetooth profile from a host device. Because the host device initiates operations for setup of the communication link, the host device may be cognizant of the Bluetooth profile. In another implementation, the Bluetooth profile detection unit 112 may sniff packets exchanged during communication link setup operations, read content of the packets, and determine the Bluetooth profile of the communication link. In it is noted, however, that in other implementations the Bluetooth profile can be determined by other methods, e.g., a coexistence device or other background process may determine the Bluetooth profile and communicate the Bluetooth profile to the Bluetooth profile detection unit 112.

The transmit rate selection unit 110 receives an indication of the Bluetooth profile from the Bluetooth profile detection unit 112 and an indication of a current packet error rate from the Bluetooth receive unit 104. The transmit rate selection unit 110 access the transmit rate threshold database 114 to compare the performance indicators of the Bluetooth receive packet with certain pre-defined transmit rate thresholds. The pre-defined thresholds may vary depending on whether or not the Bluetooth profile is an FTP profile. Because data transmitted on the FTP communication link is more susceptible to errors, the transmit rate threshold database 114 may comprise lower tolerance thresholds for the FTP profile and higher tolerance thresholds for the non-FTP profiles. The thresholds for the FTP profile enable the transmit rate selection unit 110 to aggressively request the transmitting Bluetooth device 120 to reduce the packet transmit rate to more robust and slower rates when the current PER exceeds a low threshold, as will be further described below with reference to FIGS. 2-4. However, because the non-FTP profiles such as PAN or A2DP, comprise upper layer data reliability checks and retransmission capabilities that can protect data from corruption, the transmit rate selection unit 110 may request the transmitting Bluetooth device 120 to maintain the packet transmit rate at a higher rate with a higher packet error rate threshold before reducing packet transmit rate.

In other words, the transmit rate selection unit 110 adopts a more conservative set of thresholds for the FTP communication links. For example, if the transmit rate selection unit 110 detects a slight increase in PER (e.g., which crosses thresholds defined for the FTP communication links), the transmit rate selection unit 110 can request the transmitting Bluetooth device 120 to reduce the transmit packet rate to a more reliable but slow packet transmit rate. As an example, because a packet transmit rate of 3 Mbps requires more SNR than a packet transmit rate of 2 Mbps, the transmit rate selection unit 110 may request the transmitting Bluetooth device 120 to transmit more robust packets (e.g., 2 Mbps) on the FTP communication link. Alternately, the transmit rate selection unit 110 may adopt a more aggressive set of thresholds for communication links with the non-FTP profile ("non-FTP communication links"). For example, if the transmit rate selection unit 110 detects an increase in PER (e.g., if the PER crosses thresholds defined for the non-FTP communication links), the transmit rate selection unit 110 may continue to receive/transmit higher throughput packets (e.g., 3 Mbps packets as opposed to 2 Mbps packets) relying on upper layer data reliability checks to detect and discard corrupted packets.

Based on comparing a current PER with the thresholds defined for the communication links, the transmit rate selection unit 110 may determine whether the packet transmit rate of the transmitting Bluetooth device 120 should be increased or decreased. After the transmit rate selection unit 110 determines the packet transmit rate for the transmitting Bluetooth device 120, the transmit rate selection unit 110 can direct the Bluetooth transmit unit 102 to transmit an indication of the packet transmit rate to the transmitting Bluetooth device 120. The transmit rate selection unit 110 may communicate an absolute value of the packet transmit rate or a difference between the current packet transmit rate and a new packet transmit rate to the Bluetooth transmit unit 102. The Bluetooth transmit unit 102 may, in turn, encapsulate the indication of the packet transmit rate in a packet, modulate the packet onto a Bluetooth signal and transmit the Bluetooth signal to the transmitting Bluetooth device 120.

The power management unit 108 receives an indication of the Bluetooth profile from the Bluetooth profile detection unit 112 and the performance indicators from the Bluetooth receive unit 104. The power management unit 108 determines whether a transmit power level of the transmitting Bluetooth device 120 is at an acceptable level. In some implementations, the power management unit 108 may access the power threshold database 116 to compare performance indicators (e.g., the PER and/or the RSSI) with certain pre-defined thresholds. The pre-defined thresholds may vary depending on whether or not the Bluetooth profile of the communication link is an FTP profile. As indicated above, the FTP profile does not comprise upper layer data integrity checks and, therefore, data transmitted on the FTP communication link more susceptible to errors. Thus, the power threshold database 116 may comprise lower tolerance thresholds for the FTP profile and higher tolerance thresholds for a non-FTP profile. After the power management unit 108 determines the transmit power for the transmitting Bluetooth device 120, the power management unit 108 directs the Bluetooth transmit unit 102 to transmit an indication of the transmit power to the transmitting Bluetooth device 120. The power management unit 108 may communicate a difference between a current transmit power and a new transmit power to the Bluetooth transmit unit 102. The Bluetooth transmit unit 102 may, in turn, encapsulate the indication of the transmit power in a packet, modulate the packet onto a Bluetooth signal and transmit the Bluetooth signal to the transmitting Bluetooth device 120.

Figure 2:
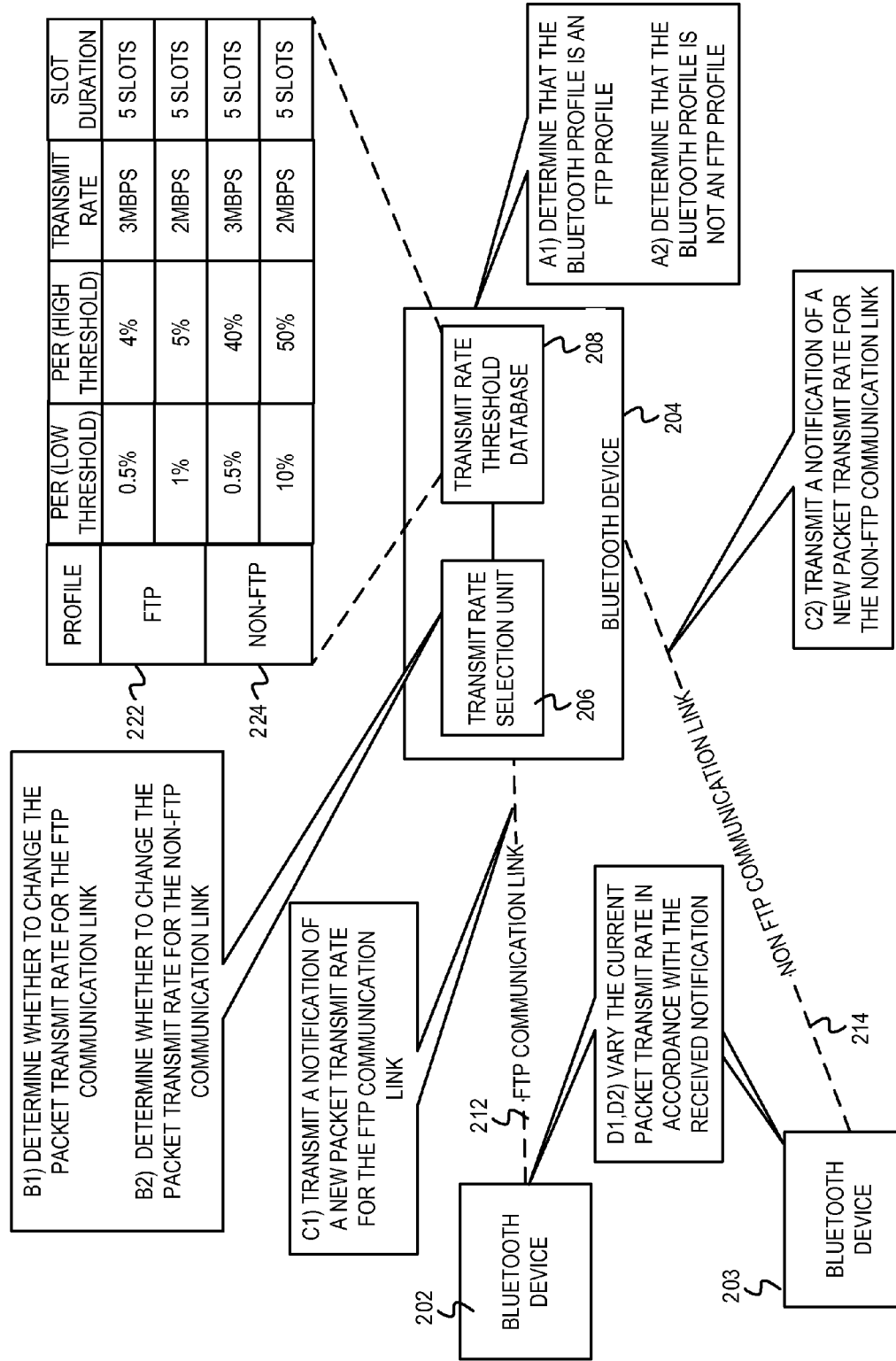
FIG. 2 is an example conceptual diagram illustrating example operations for Bluetooth profile based packet transmit rate adaptation.

FIG. 2 is an example conceptual diagram illustrating example operations for Bluetooth profile based packet transmit rate adaptation. FIG. 2 depicts three Bluetooth devices 202, 203, and 204. The Bluetooth devices 202 and 203 may be transmitting Bluetooth devices, while the Bluetooth device 204 may be a receiving Bluetooth device. The Bluetooth device 202 and the Bluetooth device 204 communicate via an FTP communication link 212. The Bluetooth device 203 and the Bluetooth device 204 communicate via a non-FTP communication link 214. The non-FTP communication link 214 may implement any suitable non-FTP profile, such as PAN, A2DP, etc. depending on the type of data being exchanged. Additionally, the receiving Bluetooth device 204 comprises a transmit rate selection unit 206 and a transmit rate threshold database 208. The transmit rate selection unit 206 is coupled to the transmit rate threshold database 208. The transmit rate selection unit 206 implements functionality to vary a packet transmit rate of the communication links 212 and 214 based on the profile of the Bluetooth communication link as will be described below.

At stage A1, the Bluetooth device 204 determines that the Bluetooth profile is an FTP profile. For example, a Bluetooth profile detection unit 112 of FIG. 1 may determine the Bluetooth profile and communicate an indication of the Bluetooth profile to the transmit rate selection unit 206.

At stage B1, the transmit rate selection unit 206 determines whether to change the packet transmit rate for the FTP communication link 212 based on a comparison of a current packet error rate to a set of thresholds. In some implementations, the Bluetooth device 204 (e.g., the Bluetooth receive unit 104) may determine the current packet error rate. The Bluetooth device 204 may determine an average packet error rate over a pre-determined number of packets, an average packet error rate over packets received within a pre-determined time interval, etc. The transmit rate selection unit 206 can access the transmit rate threshold database 208 to determine whether to change the packet transmit rate. The transmit rate threshold database 208 comprises an upper threshold and a lower threshold for each combination of packet transmit rate and slot duration. The transmit rate threshold database 208 may comprise a different set of thresholds for FTP communication links and non-FTP communication links. For example, the transmit rate selection unit 206 may access the thresholds 222 for FTP communication links ("FTP thresholds") in the transmit rate threshold database 208, compare the current packet error rate with the upper and lower thresholds, and accordingly determine whether the transmitting Bluetooth device 202 should change the packet transmit rate, as will be further described below with reference to FIGS. 3 and 4. Referring to the FTP thresholds 222 in the transmit rate threshold database 208, in one specific example, if the packet transmit rate is 3 Mbps/5 slots and the current packet error rate is greater than 4%, the transmit rate selection unit 206 may decrease the packet transmit rate to 2 Mbps/5 slots.

It is noted that, while in some embodiments the packet transmit rate is varied, in other embodiments, the packet transmit rate and/or the slot duration may be varied. For example, for communication links that support enhanced data rate (EDR), the packet transmit rates can be 2 Mbps and 3 Mbps. For EDR, in one example, the packet transmit rate and/or slot duration may be increased in the following order: 2-DH1, 2-DH3, 2-DH5, 3-DH1, 3-DH3, and 3-DH5. In one example, the packet transmit rate may be reduced in of the following order: 3-DH5, 2-DH5, 2-DH3, and 2-DH1. As another example, for communication links that do not support EDR, DM and DH rates with 1-5 slots may be used. For communication links that do not support EDR, DH-5 packet transmit rates may be used when high SNR is detected, while DM packet transmit rates may be used when low SNR is detected.

At stage C1, the transmit rate selection unit 206 transmits a notification of a new packet transmit rate for the FTP communication link 212, if it is determined that the packet transmit rate should be changed. In one implementation, the transmit rate selection unit 206 may transmit the absolute value of the new packet transmit rate. Referring to the previous example, the transmit rate selection unit 206 may transmit a message to the transmitting Bluetooth device 202 indicating that the new packet transmit rate should be 2 Mbps/5 slots. Alternately, the transmit rate selection unit 206 may transmit the difference between a current packet transmit rate and the new packet transmit rate. For example, the transmit rate selection unit 206 may transmit a message to the transmitting Bluetooth device 202 indicating that the current packet transmit rate should be decreased by 1 Mbps. In another implementation, the notification may indicate the new packet transmit rate and/or a new slot duration.

At stage D1, the transmitting Bluetooth device 202 varies the current packet transmit rate in accordance with the notification (transmitted at stage C1). Subsequent packets exchanged between the Bluetooth devices 202 and 204, on the FTP communication link 212, may be transmitted at the new packet transmit rate. In some embodiments, the subsequent packets exchanged between the Bluetooth devices 202 and 204, on the FTP communication link 212 may have the new packet transmit rate and/or the new slot duration. It should be noted that the receiving Bluetooth device 204 might continuously monitor the packet error rate to ensure that the packet error rate lies between FTP packet error rate thresholds associated with the current packet transmit rate and slot duration.

In some implementations, the transmit rate selection unit 206 performs a different set of operations for the non-FTP communication links as described in stages A2-D2.

At stage A2, the Bluetooth device 204 determines that the Bluetooth profile is not an FTP profile. The transmit rate selection unit 206 may receive a notification of the Bluetooth profile of the communication link 214 from the Bluetooth profile detection unit 112 and determine that the Bluetooth profile is not the FTP profile. The Bluetooth profile of the communication link 214 may be PAN, A2DP, etc.

At stage B2, the transmit rate selection unit 206 determines whether to change a packet transmit rate for the non-FTP communication link 214, based on a comparison of a current packet error rate to a set of thresholds. In some implementations, the Bluetooth device 204 (e.g., the Bluetooth receive unit 104) may determine the current packet error rate for the non-FTP communication link 214. The transmit rate selection unit 206 may also access the transmit rate threshold database 208 to determine whether to change the packet transmit rate. In FIG. 2, the transmit rate selection unit 206 may access a set of thresholds 224 for the non-FTP communication link 214 ("non-FTP thresholds") in the transmit rate threshold database 208, compare the current packet error rate with the upper and lower thresholds, and accordingly determine whether the transmitting Bluetooth device 203 should change the packet transmit rate as will be described below with reference to FIGS. 3 and 4. Referring to the non-FTP thresholds 224 in the transmit rate threshold database 208, in one specific example, if the packet transmit rate is 3 Mbps/5 slots and the current packet error rate exceeds 40%, the transmit rate selection unit 206 may decrease the packet transmit rate to 2 Mbps/5 slots. As described above, in some embodiments, either one or both of the packet transmit rate and the slot duration may be varied if the PER exceeds the non-FTP thresholds 224.

At stage C2, the transmit rate selection unit 206 transmits a notification of a new packet transmit rate for the non-FTP communication link 214, if it is determined that the packet transmit rate should be changed. In one implementation, the transmit rate selection unit 206 may transmit a message to the transmitting Bluetooth device 203 indicating the absolute value of the new packet transmit rate (e.g., 2 MB/5 slots). In another implementation, the transmit rate selection unit 206 may transmit the difference between a current packet transmit rate and the new packet transmit rate (e.g., decrease the current packet transmit rate by 1 Mbps). In another implementation, the notification may indicate the new packet transmit rate and/or a new slot duration.

At stage D2, the transmitting Bluetooth device 203 varies the current packet transmit rate in accordance with the notification (transmitted at stage C2). Subsequent packets exchanged between the Bluetooth devices 203 and 204 on the non-FTP communication link 214, may be transmitted at the new packet transmit rate. In some embodiments, the subsequent packets exchanged between the Bluetooth devices 203 and 204, on the non-FTP communication link 214 may have the new packet transmit rate and/or the new slot duration. It should be noted that the receiving Bluetooth device 204 might continuously monitor the packet error rate to ensure that the packet error rate lies between non-FTP packet error rate thresholds.

Figure 3:
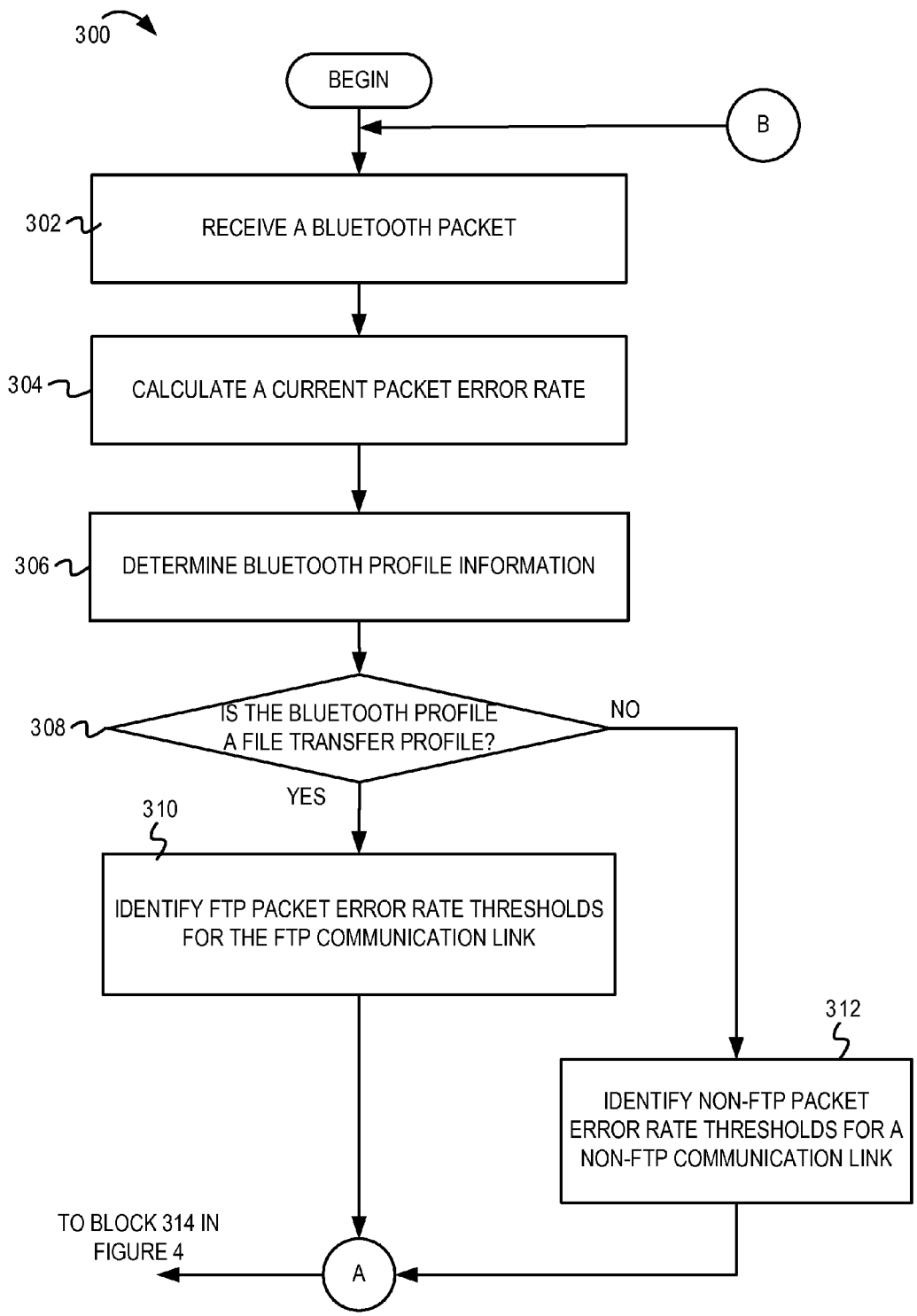
FIG. 3 depicts a flow diagram illustrating example operations for Bluetooth profile-based configuration of a packet transmit rate.
Figure 4:
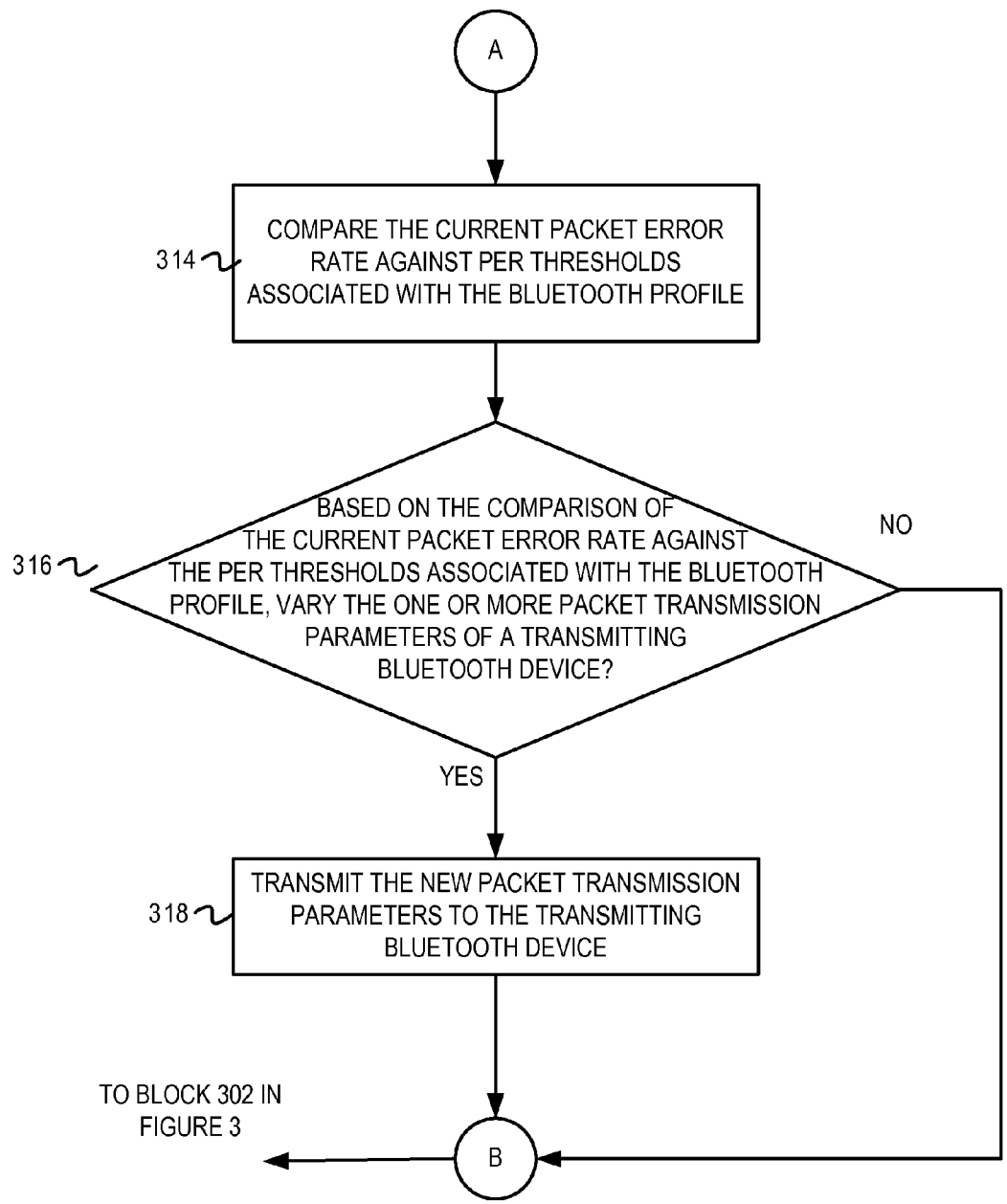
FIG. 4 depicts a flow diagram illustrating example operations for Bluetooth profile-based configuration of a packet transmit rate.

FIG. 3 and FIG. 4 depict a flow diagram illustrating example operations for Bluetooth profile-based configuration of a packet transmit rate. Flow 300 begins at block 302 in FIG. 3.

At block 302, a Bluetooth packet is received. For example, the Bluetooth receive unit 104 of FIG. 1 may receive the Bluetooth packet. The Bluetooth packet may be a control packet (e.g., an inquiry packet, a polling packet, etc.). The Bluetooth packet can comprise a device identifier (e.g., a MAC address) of a transmitting Bluetooth device. Alternately, the Bluetooth packet may be a data packet comprising data (e.g., audio data, text, images, etc). The flow continues at block 304.

At block 304, a current packet error rate (PER) is calculated. For example, the Bluetooth receive unit 104 may calculate the PER of any suitable number of Bluetooth packets. In one implementation, the Bluetooth receive unit 104 may calculate the PER over packets received within a pre-defined time interval. For example, the Bluetooth receive unit 104 may calculate the PER across packets received in a 10 second time interval. In another implementation, the Bluetooth receive unit 104 may calculate the PER over a pre-determined number of packets. For example, the Bluetooth receive unit 104 may calculate the PER over the last 100 received packets. In some embodiments, the Bluetooth receive unit 104 may calculate the PER over a pre-determined number of packets for each packet type. For example, a communication link might primarily use 3-DH5 packet transmit rates. Based on frame segmentation, a 2047-byte frame may be fragmented into two 1021-byte 3-DH5 packets and one 6-byte 3-DH1 (or DM1) packet. The Bluetooth receive unit 104 may determine the PER separately for the 3-DH5 packets and for the 3-DH1 packet.

The Bluetooth receive unit 104 may calculate the PER as a number of packets that are incorrectly received (e.g., based on comparing a received and a calculated CRC value for data in the packet). Alternately, the Bluetooth receive unit 104 may calculate the PER as a percentage of packets that are incorrectly received. In some implementations, the Bluetooth receive unit 104 may update the current PER each time a new packet is received. In other implementations, the Bluetooth receive unit 104 may calculate a new PER after a pre-defined time interval elapses or after a pre-defined number of packets are received. Additionally, the Bluetooth receive unit 104 may also calculate a long-term PER, e.g., received over the last 1600 received packets. The flow continues at block 306.

At block 306, profile information of a communication link established between communicating Bluetooth devices ("Bluetooth profile information") is determined. The Bluetooth profile information describes specifications and requirements that the communicating Bluetooth devices should meet in order to exchange a certain type of information. The Bluetooth profile information may also indicate Bluetooth protocols that may be used to exchange information over the communication link. For example, the communicating Bluetooth devices may use a file transfer profile (FTP) with an OBEX/RFCOMM protocol to exchange data files among peers. As another example, a hands-free profile (HFP) may define specifications for using a mobile phone in conjunction with a hand-free input/output audio device over a Bluetooth communication link. As another example, an advanced audio distribution profile (A2DP) may define specifications for streaming audio from one device to another device over a Bluetooth communication link.

In one implementation, a Bluetooth profile detection unit 112 may receive a notification of the Bluetooth profile information from a host device. The host device may be any suitable electronic device (e.g., a laptop, a mobile phone, etc.) comprising the Bluetooth device 100. The host device or Bluetooth stack associated with the Bluetooth device 100 may be responsible for initiating operations to setup the Bluetooth communication links, instructing the Bluetooth device 100 to create the Bluetooth communication link, etc. The Bluetooth stack or a background process running on the host device may determine the Bluetooth profile information and communicate the Bluetooth profile information to the Bluetooth profile detection unit 112. In another implementation, the Bluetooth stack may provide the Bluetooth profile information for the communication link, to the Bluetooth profile detection unit 112, via an HCI command (or any suitable command).

In another implementation, the Bluetooth profile detection unit 112 may obtain the Bluetooth profile information from the profiles or may interface with driver software that interacts with a profile application-programming interface (API) to determine the Bluetooth profile information. In another implementation, the Bluetooth profile detection unit 112 may sniff packets exchanged during communication link setup operations, read content of the packets, and determine the Bluetooth profile information for the communication link. In another implementation, the Bluetooth profile detection unit 112 may interface with other processing units to determine the Bluetooth profile information. For example, a coexistence unit on the Bluetooth device 100, a collocated WLAN device, or the host device may determine the Bluetooth profile information for proper allocation of a communication medium and for enabling coexistence between Bluetooth and WLAN communications. The Bluetooth profile detection unit 112 may request the Bluetooth profile information from the coexistence unit and communicate the Bluetooth profile information to the Bluetooth profile detection unit 112. The flow continues at block 308.

At block 308, it is determined whether the Bluetooth profile is a file transfer profile (FTP) based on the Bluetooth profile information determined at block 306. For example, the transmit rate selection unit 110 may determine whether the Bluetooth profile is the FTP profile. In one implementation, the transmit rate selection unit 110 may determine whether or not the Bluetooth profile is the FTP profile based on the Bluetooth profile information and/or determining a Bluetooth communication protocol of the communication link. For example, the transmit rate selection unit 110 may determine that the communication link implements an OBEX/RF-COMM protocol, which indicates that the Bluetooth profile of the communication link may be the FTP profile. As another example, the transmit rate selection unit 110 may determine that the communication link implements a TCP/IP protocol, which indicates that the Bluetooth profile of the communication link is not the FTP profile. Additionally, the transmit rate selection unit 110 may also determine that the non-FTP profile comprises other data reliability checks (e.g., receiving acknowledgements from a receiving Bluetooth device), additional data integrity checks, encryption, etc. and may not need additional data protection. Depending on whether or not the Bluetooth profile is the FTP profile, the transmit rate selection unit 110 may select different packet transfer rates and/or slot durations, compare the current PER to different sets of thresholds, etc. If the transmit rate selection unit 110 determines that the Bluetooth profile is the FTP profile, the flow continues at block 310. Otherwise, the flow continues at block 312.

At block 310, FTP PER thresholds for an FTP communication link are identified. In one implementation, the transmit rate selection unit 110 identifies the set of FTP PER thresholds for the FTP communication link. The transmit rate selection unit 110 may access a transmit rate threshold database 114 to identify the set of FTP PER thresholds for the FTP communication link. For each combination of packet transmit rate and slot duration, the transmit rate threshold database 114 comprises a lower PER threshold and an upper PER threshold. For example, the upper PER threshold indicates a maximum acceptable PER for a given combination of packet transmit rate and slot duration. If the current PER exceeds the upper PER threshold, the transmit rate selection unit 110 may decrease the packet transmit rate. Likewise, the transmit rate selection unit 110 may determine that the packet transmit rate of the transmitting Bluetooth device should be increased, if the current PER falls below the lower PER threshold. In one specific example, referring to the transmit rate threshold database 208 of FIG. 2, for the FTP communication link, for a 3 Mbps packet transmit rate and a slot duration of 5 slots, the current PER may be no larger than 4%. If the current PER increases beyond 4%, the transmit rate selection unit 110 may determine that the packet transmit rate of the transmitting Bluetooth device should be dropped to 2 Mbps. Likewise, if the current PER increases beyond 5%, the transmit rate selection unit 110 may determine that the packet transmit rate of the transmitting Bluetooth device should be dropped to 1 Mbps. It should be noted that in some embodiments the packet transmit rate and/or the slot duration may be varied, as will be further described below.

Additionally, in some implementations, for each combination of packet transmit rate and slot duration, the transmit rate threshold database 114 may also comprise short-term and long-term upper and lower FTP PER thresholds. The transmit rate selection unit 110 may compare the current PER averaged over a small number of packets (e.g., 10 packets) against the short-term FTP PER thresholds. The short term FTP PER thresholds allow the transmit rate selection unit 110 to quickly adjust the packet transmit rate if the PER of the FTP communication link varies at a fast rate. The transmit rate selection unit 110 may compare the PER averaged over a larger number of packets (e.g., 1000 packets) against the long term FTP PER thresholds. For example, for the FTP communication link, the transmit rate selection unit 110 may increase the packet transmit rate from 2 Mbps to 3 Mbps if the transmit rate selection unit 110 determines that a long term PER is below 1%. As another example, the transmit rate selection unit 110 may drop the packet transmit rate from 2 Mbps to 1 Mbps if the transmit rate selection unit 110 determines that a long term PER is greater than 5%. The flow continues at block 314 in FIG. 4.

At block 312, non-FTP PER thresholds for a non-FTP communication link are identified. In one implementation, the transmit rate selection unit 110 identifies the set of thresholds for the non-FTP communication link. The transmit rate selection unit 110 may access the transmit rate threshold database 114 to identify the set of thresholds for the non-FTP communication link. As described earlier, for each combination of packet transmit rate and slot durations for the non-FTP communication link, the transmit rate threshold database 114 comprises a lower PER threshold and an upper PER threshold. In one specific example, referring to the transmit rate threshold database 208 of FIG. 2, for a non-FTP profile, for a 3 Mbps packet transmit rate and duration of 5 slots, the current PER may be no larger than 40%. If the current PER increases beyond 40%, it may be determined that the packet transmit rate of the transmitting Bluetooth device should be dropped to 2 Mbps. Likewise, if the current PER increases beyond 50%, it may be determined that the packet transmit rate of the transmitting Bluetooth device should be decreased to 1 Mbps. Additionally, for each combination of packet transmit rate and slot duration, the transmit rate threshold database 114 may also comprise short-term and long-term upper and lower PER thresholds for the non-FTP communication link. For example, for the non-FTP communication link, the transmit rate selection unit 110 may determine that the packet transmit rate of the transmitting Bluetooth device should be increased from 2 Mbps to 3 Mbps even if the transmit rate selection unit 110 determines an increase in PER (e.g., from 5% to 10%). The transmit rate selection unit 110 may determine that the packet transmit rate of the transmitting Bluetooth device should not be dropped until the current PER exceeds a higher threshold, e.g., 40%. It should be noted that in some embodiments the packet transmit rate and/or the slot duration may be varied. The flow continues at block 314 in FIG. 4.

At block 314, the current PER is compared against the set of thresholds associated with the Bluetooth profile. For example, the transmit rate selection unit 110 may compare the current PER with the set of thresholds associated with the Bluetooth profile. In other words, if the Bluetooth profile is the FTP profile, the transmit rate selection unit 110 may compare the current PER against the lower and upper FTP PER thresholds identified (at block 310) for the FTP communication link. Likewise, if the Bluetooth profile is not the FTP profile, the transmit rate selection unit 110 may compare the current PER against the lower and upper non-FTP PER thresholds identified (at block 312) for the non-FTP communication link. The transmit rate selection unit 110 may compare the current PER against the set of thresholds associated with the Bluetooth profile to determine whether or not the packet transmit rate of the transmitting Bluetooth device should be varied. The flow continues at block 316.

At block 316, based on the comparison of the current PER against the set of thresholds associated with the Bluetooth profile, it is determined whether one or more packet transmission parameters of the transmitting Bluetooth device should be varied. In one embodiment, the transmit rate selection unit 110 may determine, based on PER thresholds associated with the communication link and the current PER, whether the packet transmit rate of the transmitting Bluetooth device should be varied. In another embodiment, the transmit rate selection unit 110 may determine, based on PER thresholds associated with the communication link and the current PER, whether the slot duration of the transmitting Bluetooth device should be varied. In another embodiment, the transmit rate selection unit 110 may determine whether both the packet transmit rate and the slot duration should be varied.

The transmit rate selection unit 110 may access a set of rules and determine a factor by which the packet transmit rate of the transmitting Bluetooth device should be varied. For example, for the FTP communication link, if the current PER is 6%, the transmit rate selection unit 110 may compare the current PER against a set of upper limit FTP PER thresholds and determine that the current PER is above the upper limit FTP PER threshold of 4%. Based on the set of rules, the transmit rate selection unit 110 may determine that the packet transmit rate of the transmitting Bluetooth device should be decreased by 1 Mbps (or any suitable value). As another example, for the non-FTP communication link, the transmit rate selection unit 110 may determine that the current PER is 45%, determine that the current PER is greater than an upper limit FTP PER threshold of 40%, and determine that the packet transmit rate for the non-FTP communication link should be decreased by 1 Mbps (or any suitable value). In one implementation, the transmit rate selection unit 110 may reduce the packet transmit rate by a fixed value (e.g., 1 Mbps).

In another implementation, the transmit rate selection unit 110 may reduce the packet transmit rate by different values depending on the current PER, the upper limit FTP PER threshold, etc. The transmit rate selection unit 110 may compare the current PER against various sets of FTP PER thresholds (e.g., 0.5% to 4%, 4% to 7%, etc.). Based on the range within which the current PER falls, the transmit rate selection unit 110 may determine that the packet transmit rate of the transmitting Bluetooth device should be decreased by a different amount. For example, if the transmit rate selection unit 110 determines that the current PER falls within the range 4% to 7%, the transmit rate selection unit 110 may determine that the packet transmit rate should be decreased by 1 Mbps (or a first suitable value). As another example, the transmit rate selection unit 110 may determine that the packet transmit rate should be decreased by 1.5 Mbps (or a second suitable value) if it is determined that the current PER lies within the range 7% to 10%.

In another implementation, the transmit rate selection unit 110 may determine an appropriate packet transmit rate associated with the range of FTP PER thresholds within which the current PER lies. For example, for the FTP communication link, the transmit rate selection unit 110 may determine that the current PER lies in the range 4% to 7%. The transmit rate selection unit 110 may also determine that an appropriate packet transmit rate for the FTP communication link with the current PER in the range 4% to 7% is 2 MB/5 slots. As another example, for the non-FTP communication link, if the current PER is 10%, the transmit rate selection unit 110 may compare the current PER with various sets of non-FTP PER thresholds (e.g., 0.5% to 40%, 40% to 60%, etc.). The transmit rate selection unit 110 may determine that the current PER falls within the range 0.5% to 40%. The transmit rate selection unit 110 may also determine that an appropriate packet transmit rate for the non-FTP communication link with the current PER in the range 0.5% to 40% is 3 MB/5 slots.

In some implementations, the transmit rate selection unit 110 may compare a current packet transmit rate with a packet transmit rate associated with the FTP PER thresholds. For example, the transmit rate selection unit 110 may determine that the current packet transmit rate is 3 Mbps and that the packet transmit rate associated with the FTP PER thresholds is 2 Mbps. The transmit rate selection unit 110 may, therefore, determine that the current packet transmit rate of the transmitting Bluetooth device should be reduced. As another example, the transmit rate selection unit 110 may determine that with a current PER of 10%, the new packet transmit rate for the non-FTP communication link is 3 Mbps. The transmit rate selection unit 110 may determine the current packet transmit rate for the non-FTP communication link (e.g., 2 Mbps), compare the current packet transmit rate with the new packet transmit rate (e.g., 3 Mbps), and determine that the current packet transmit rate of the transmitting Bluetooth device should be increased.

In some implementations, each combination of packet transmit rate and slot duration may be associated with a set of thresholds. For example, for an FTP communication link (e.g., the communication link 212 shown in FIG. 2), the lower and the upper FTP PER thresholds associated with a packet transmit rate of 3 Mbps and slot duration of 5 slots may be 0.5% and 4%. As another example, for the FTP communication link, the lower and the upper FTP PER thresholds associated with a packet transmit rate of 2 Mbps and slot duration of 5 slots may be 1% and 5%. As another example, for the non-FTP communication link, the lower and the upper non-FTP PER thresholds associated with a packet transmit rate of 3 Mbps and slot duration of 5 slots may be 0.5% and 40%. Based on the current packet transmit rate, the current PER may be compared against a different set of thresholds. For example, if the current packet transmit rate is 3 Mbps and the current PER for the FTP communication link may be compared against the 0.5% and 4% thresholds to determine whether the packet transmit rate of the transmitting Bluetooth device should be varied. The packet transmit rate may be decreased if the current PER is greater than the upper FTP threshold of 4%. It may be determined that the packet transmit rate of the transmitting Bluetooth device should be increased if the current PER is less than the lower FTP threshold of 0.5%. If the current PER lies between lower and upper PER limits for the FTP communication link (e.g., between 0.5% and 4%), the current PER may be at an acceptable range and the transmit rate selection unit 110 may not vary the packet transmit rate.

In some embodiments, instead of varying the packet transmit rate, as described above, the slot duration may be varied based on comparing the current PER with the set of thresholds associated with the Bluetooth profile. For example, the current PER may be compared against the set of thresholds to determine that the slot duration of the transmitting Bluetooth device should be decreased. Thus, if a current packet transmit rate/slot duration of the transmitting Bluetooth device is 2-DH5, it may be determined that a new packet transmit rate/slot duration of the transmitting Bluetooth device should be 2-DH1.

In some embodiments, both the packet transmit rate and the slot duration may be varied, based on comparing the current PER with the set of thresholds associated with the Bluetooth profile. For example, the current PER may be compared against the set of thresholds to determine that both the packet transmit rate and the slot duration of the transmitting Bluetooth device should be increased. Thus, if a current packet transmit rate/slot duration of the transmitting Bluetooth device is 2-DH5, it may be determined that a new packet transmit rate/slot duration of the transmitting Bluetooth device should be 3-DH1.

If the transmit rate selection unit 110 determines that the one or more packet transmission parameters of the transmitting Bluetooth device should be varied, the flow continues at block 318. Otherwise, the flow loops back to block 302 in FIG. 3, where a new current PER is calculated and the transmit rate selection unit 110 determines whether one or more packet transmission parameters of the transmitting Bluetooth device should be varied. It should be noted that the Bluetooth device may continue receiving packets while the transmit rate selection unit 110 performs operations described with reference to FIG. 3.

At block 318, the new packet transmission parameters are communicated to the transmitting Bluetooth device. For example, the transmit rate selection unit 110 may direct a Bluetooth transmit unit 102 to transmit a Bluetooth packet indicating a new packet transmit rate. The transmit rate selection unit 110 may provide an absolute value of the new packet transmit rate to the transmitting Bluetooth device. For example, if the current packet transmit rate is 3 Mbps and the new packet transmit rate is 2 Mbps, the transmit rate selection unit 110 may provide "2 Mbps" to the transmitting Bluetooth device. As another example, the transmit rate selection unit 110 may direct the Bluetooth transmit unit 102 to transmit a Bluetooth packet indicating a new slot duration. As another example, the transmit rate selection unit 110 may direct the Bluetooth transmit unit 102 to transmit a Bluetooth packet indicating both the new slot duration and the new packet transmit rate. The transmit rate selection unit 110 may not transmit a notification to the transmitting Bluetooth device if current values of the packet transmission parameters are unchanged. On receiving the new packet transmission parameters, the transmitting Bluetooth device may increase/decrease the current packet transmission parameters as required. Further communications between the communicating Bluetooth devices may be initiated at the new packet transmission parameters. From block 320, the flow loops back to block 302 in FIG. 3.

It should be noted that after the transmit rate selection unit 110 compares the current PER against the set of PER thresholds associated with the communication links and varies (if necessary) the packet transmit rate, the transmit rate selection unit 110 may determine a new current PER (using a different number of packets, by varying a previous PER to account for other received packets, etc.). The transmit rate selection unit 110 may compare the new current PER against the PER thresholds associated with the FTP or non-FTP communication link, and determine whether the packet transmit rate of the transmitting Bluetooth device should be varied. For example, for the non-FTP communication link, the lower and the upper limit thresholds for a packet transmit rate of 5 Mbps may be 10% and 50% respectively. The transmit rate selection unit 110 may compare the current PER (e.g., 55%) with the thresholds, determine that the current PER is greater than the upper limit threshold, and determine that the packet transmit rate of the transmitting Bluetooth device should be dropped to 3 Mbps. The transmit rate selection unit 110 may determine that the upper and the lower limit thresholds for a packet transmit rate of 3 Mbps are 0.5% and 30% respectively. The transmit rate selection unit 110 may calculate a new current PER (e.g., 35%), determine that the current PER is greater than the upper limit threshold, and determine that the packet transmit rate of the transmitting Bluetooth device should be dropped further. The transmit rate selection unit 110 may vary the packet transmit rate until the current PER falls within acceptable threshold limits associated with the Bluetooth communication link profile and the packet transmit rate.

Figure 5:
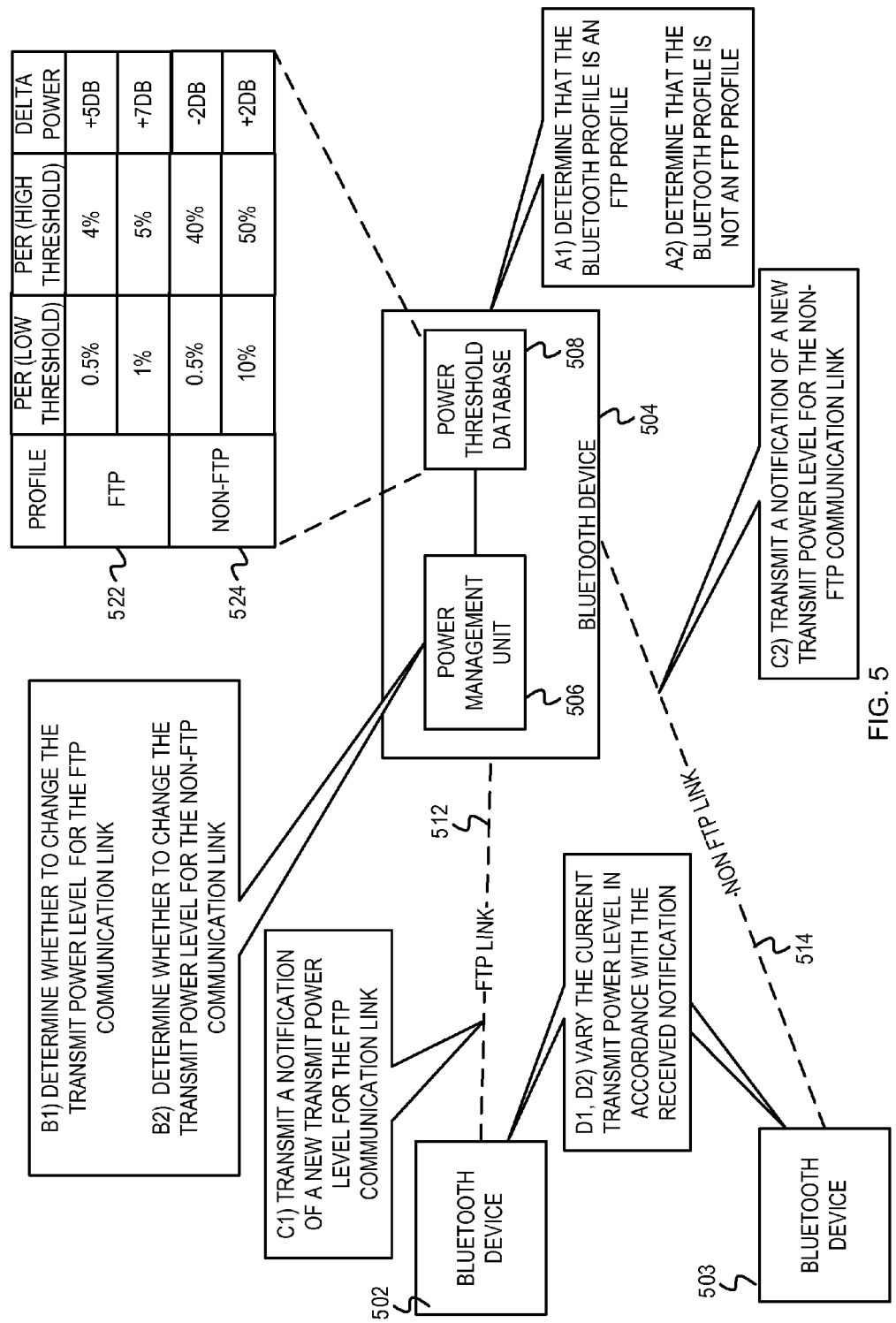
FIG. 5 is an example conceptual diagram illustrating example operations for modifying transmit power levels depending on a Bluetooth profile.

FIG. 5 is an example conceptual diagram illustrating example operations for Bluetooth profile-based transmit power level adaptation. FIG. 5 depicts three Bluetooth devices 502, 503, and 504. The Bluetooth devices 502 and 503 may be transmitting Bluetooth devices, while the Bluetooth device 504 may be a receiving Bluetooth device. The Bluetooth device 502 and the Bluetooth device 504 communicate via an FTP communication link 512. The Bluetooth device 503 and the Bluetooth device 504 communicate via a non-FTP communication link 514. Additionally, the receiving Bluetooth device 504 comprises a power management unit 506 coupled to the power threshold database 508. The power management unit 506 implements functionality to vary a transmit power level based on the profile of the Bluetooth communication link as will be described below.

At stage A1, the Bluetooth device 204 determines that the Bluetooth profile for the communication link 512 is an FTP profile. For example, a Bluetooth profile detection unit 112 of FIG. 1 may determine the Bluetooth profile and communicate the Bluetooth profile to the power management unit 506. The power management unit 506 may determine that the Bluetooth profile is the FTP profile based on an indication from the Bluetooth profile detection unit 112, based on determining that an OBEX/RFCOMM protocol is used for data transfer on the communication link 512, etc.

At stage B1, the power management unit 506 determines whether to change a current transmit power level for the FTP communication link 512, based on a comparison of a current packet error rate to a set of thresholds. In some implementations, the Bluetooth device 504 may determine the current PER, e.g., similarly as described above with reference to FIGS. 1-4. The power management unit 506 can access the power threshold database 508 to determine whether the transmit power level of the transmitting Bluetooth device 502 should be changed. The power threshold database 508 may comprise a different set of thresholds for FTP communication links and non-FTP communication links. For example, the power management unit 506 may access the FTP thresholds 522 in the power threshold database 508, compare the current packet error rate with the upper and lower thresholds, and accordingly determine the whether to change the transmit power level. Referring to the FTP thresholds 522 in the power threshold database 208, in one specific example, if the current PER is greater than 4%, the power management unit 506 may request that the transmitting Bluetooth device 502 increase the transmit power level by 4 dB (or other suitable increment).

In some implementations, the power management unit 506 may determine that the transmit power level should be varied based on monitoring RSSI. For example, a desired RSSI range (or "golden range") for FTP communication links may be set to between −40 dBm to −60 dBm. If a current value of RSSI drops below −60 dBm, the power management unit 506 may request the transmitting Bluetooth device 502 to increase the transmit power level. Likewise, if the current value of RSSI increases above −40 dBm, the power management unit 506 may request the transmitting Bluetooth device 502 to decrease the transmit power level to conserve power. In another implementation, the power management unit 506 may determine whether the transmitting Bluetooth device 502 should vary the transmit power level based on both the current value of RSSI and the PER.

At stage C1, the power management unit 506 transmits a notification of a new transmit power level for the FTP communication link 512 if it is determined that the transmit power level should be changed. The power management unit 506 may transmit an increment by which the transmitting Bluetooth device 502 should increase/decrease the current transmit power level. For example, the power management unit 506 may transmit a message to the transmitting Bluetooth device 502 indicating that the current transmit power level should be decreased by 2 dB.

At stage D1, the transmitting Bluetooth device 502 varies the current transmit power level in accordance with the notification (transmitted at stage C1). The transmitting Bluetooth device 502 may transmit subsequent packets, on the FTP communication link 512, at the new transmit power level. Also, the receiving Bluetooth device 504 may continuously monitor the packet error rate, compare the packet error rate against the FTP thresholds 522, and accordingly request (if necessary) the transmitting Bluetooth device 502 to vary the transmit power level for communication on the FTP communication link 512.

In some implementations, the power management unit 506 performs a different set of operations when the communicating Bluetooth devices exchange information using a non-FTP communication link, as described below in stages A2-D2.

At stage A2, the Bluetooth device 504 determines that the Bluetooth profile for the communication link 514 is not an FTP profile. The Bluetooth profile of the communication link 514 may be PAN, A2DP, etc. In one implementation, the Bluetooth profile detection unit 112 may determine and transmit an indication of the Bluetooth profile to the power management unit 506. The power management unit 506 may determine that the Bluetooth profile is not the FTP profile based on the indication of the Bluetooth profile received from the Bluetooth profile detection unit 112. Alternately, the power management unit 506 may determine that the Bluetooth profile is not the FTP profile based on determining that an OBEX/RFCOMM protocol (typically used for FTP transfers) is not used for data transfer on the communication link 514. For example, the power management unit 506 may determine that a Service discovery protocol (SDP), a Telephony Control Protocol (TCP), etc. is used for data transfer on the communication link 514.

At stage B2, the power management unit 506 determines whether to change a current transmit power level for the non-FTP communication link 514, based on a comparison of a current packet error rate to a set of thresholds. In some implementations, the Bluetooth device 504 may determine the current PER for the non-FTP communication link 514. The power management unit 506 may also access the power threshold database 508 to determine whether the transmit power level of the transmitting Bluetooth device 503. For the non-FTP communication link 514, the power threshold database 508 may comprise aggressive power thresholds to keep the current transmit power level at a relatively low but acceptable level. The power management unit 506 may rely on additional data integrity checks of the non-FTP profile to detect packets corrupted by interference and request retransmission of corrupted or lost packets. In FIG. 5, the power management unit 506 may access a set of non-FTP thresholds 524 in the power threshold database 508, compare the current packet error rate with the upper and lower thresholds, and accordingly determine whether the transmit power level of the transmitting Bluetooth device 503 should be changed. Referring to the non-FTP thresholds 524 in the power threshold database 508, in one specific example, the power management unit 506 may determine that the transmit power level of the transmitting Bluetooth device 503 should be increased by 2 dB only after the current packet error rate exceeds 50%. As described above, in some implementations, the power management unit 506 may compare a current value of RSSI against a desired RSSI range for non-FTP communication links and accordingly determine whether or not the transmitting Bluetooth device 503 should increase or decrease the transmit power level. In another implementation, the power management unit 506 may determine whether the transmitting Bluetooth device 503 should vary the transmit power level based on both the current value of RSSI and the PER.

At stage C2, the power management unit 506 transmits a notification of the new transmit power level for the non-FTP communication link 514, if it is determined that the transmit power level should be changed.

At stage D2, the transmitting Bluetooth device 203 varies the current transmit power level in accordance with the notification (transmitted at stage C2). Subsequent packets transmitted by the Bluetooth device 503 along the non-FTP communication link 514 may be transmitted at the new transmit power level.

It should be understood that the depicted diagrams (FIGS. 1 through 5) are examples meant to aid in understanding embodiments and should not be used to limit embodiments or limit scope of the claims. Embodiments may perform additional operations, fewer operations, operations in a different order, operations in parallel, and some operations differently. For instance, although FIGS. 1-4 describe operations for varying the packet transmit rate of a Bluetooth communication link based on a Bluetooth profile of the communication link, the receiving Bluetooth device can perform similar operations for varying other packet transmission parameters (e.g., transmit power level as described with reference to FIG. 5, etc.). In other implementations, in addition to varying the packet transmission parameters based on a packet error rate, factors such as received signal strength indicator (RSSI), signal to noise ratio (SNR), percentage of dropped packets, etc. may also be taken into consideration while varying the packet transmission parameters.

Also, the operations described with reference to FIGS. 1-5 can be performed for a Bluetooth device with multiple communication links. Each of the multiple communication links can support either the FTP profile or the non-FTP profiles. The Bluetooth device can determine a current PER for each of the multiple communication links, compare the current PER against different PER thresholds depending on whether or not the communication link is an FTP link, and accordingly vary the packet transmit rate for each of the multiple communication links. For example, the Bluetooth device may simultaneously operate in different modes if it has a reliable PAN link and an unreliable FTP link. FIG. 2 illustrates the scenario of the receiving Bluetooth device 204 supporting multiple communication links, and indicating, to each of the transmitting Bluetooth devices 202 and 203, variations in the packet transmit rate. Furthermore, in some embodiments, a transmitting Bluetooth device may support multiple communication links and vary the packet transmit rate along each of the multiple communication links based on indications from respective receiving Bluetooth devices.

Lastly, it should be noted that in some implementations, the Bluetooth device 204 could implement a set of reliability tests to determine whether or not received Bluetooth packets are reliable. The reliability tests may comprise testing the packet's performance indicators (e.g., SNR, RSSI, etc.) against a set of thresholds. The Bluetooth device 204 can implement a different set of reliability tests and different thresholds for the received Bluetooth packet depending on whether or not the Bluetooth packet was received over an FTP communication link. The Bluetooth device 204 may determine that the Bluetooth packet received over the FTP communication link is reliable if the Bluetooth packet passes more than 90% of the reliability tests. If the Bluetooth device 204 determines that the Bluetooth packet received over the FTP link is not reliable, the Bluetooth device 204 may discard the Bluetooth packet and request a retransmission of the Bluetooth packet. Alternately, the Bluetooth device 204 may determine that the Bluetooth packet received over the non-FTP communication link is reliable if the Bluetooth packet passes more than 60% of the reliability tests. If the Bluetooth device 204 determines that the Bluetooth packet received over the non-FTP communication link is not reliable, the Bluetooth device 204 may ignore the reliability tests and accept the Bluetooth packet relying on other data integrity checks to detect and discard corrupted Bluetooth packets. In some implementations, the Bluetooth device 204 may communicate a reliability status (e.g., whether or not the Bluetooth packet is reliable, a number of reliability tests passed, etc.) to a Bluetooth link controller and the Bluetooth link controller may determine, based on the Bluetooth profile of the communication link, whether or not to discard the Bluetooth packet.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
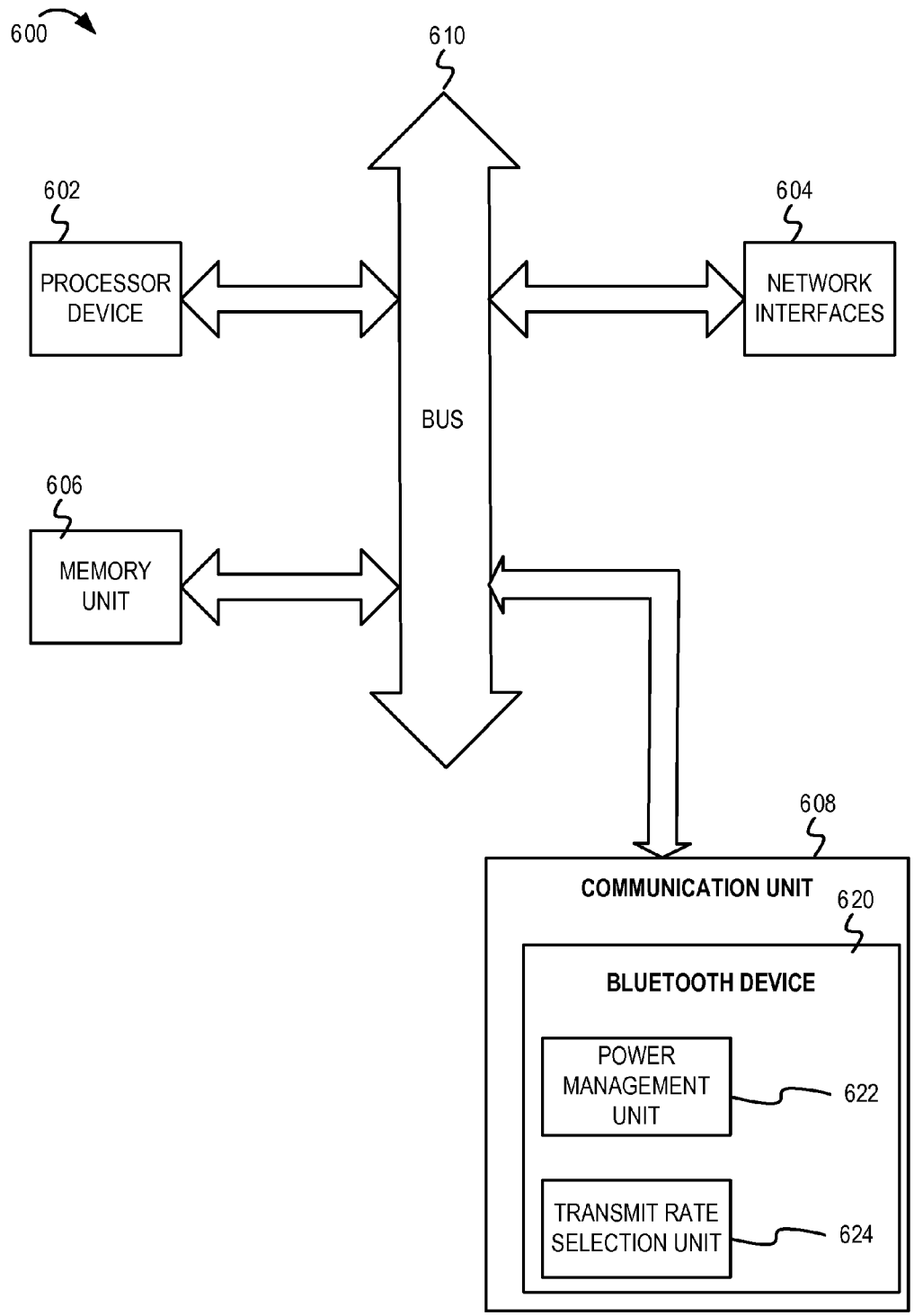
FIG. 6 is a block diagram of one embodiment of a computer system including a mechanism for profile-based adaptation of packet transmission attributes.

FIG. 6 is a block diagram of one embodiment of a computer system including a mechanism for profile-based adaptation of packet transmission attributes. In some implementations, the computer system 600 may be one of a personal computer (PC), a laptop, a netbook, a mobile phone, a personal digital assistant (PDA), or other electronic systems comprising a Bluetooth device 620. The computer system 600 includes a processor unit 602 (possibly including multiple processors, multiple cores, multiple nodes, and/or implementing multi-threading, etc.). The computer system 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 600 also includes a bus 610 (e.g., PCI, ISA, PCI-Express, HyperTransport®, InfiniBand®, NuBus, etc.), and network interfaces 604 that include at least one wireless network interface (e.g., a WLAN interface, a Bluetooth® interface, a WiMAX interface, a ZigBee® interface, a Wireless USB interface, etc.).

The computer system 600 also includes a communication unit 608. The communication unit 608 comprises the Bluetooth device 620. The communication unit 608 may also comprise a different type of wireless device (e.g., a WLAN device) collocated with the Bluetooth device 620. The Bluetooth device 620 comprises a power management unit 622 and a transmit rate selection unit 624. The transmit rate selection unit 624 implements functionality to request a transmitting Bluetooth device to vary the packet transmit rate based on whether or not a Bluetooth profile of a communication link is an FTP profile as described with reference to FIGS. 1-4. The power management unit 622 implements functionality to request the transmitting Bluetooth device to vary a transmit power level based on whether or not a Bluetooth profile of a communication link is an FTP profile as described with reference to FIG. 5.

While the embodiments are described with reference to various implementations and exploitations, it will be understood that these embodiments are illustrative and that the scope of the inventive subject matter is not limited to them. In general, techniques for profile-based packet rate adaptation for wireless systems as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for communication comprising:
    determining, by a first wireless network device, whether a wireless communication profile associated with a plurality of packets received from a second wireless network device is a first wireless communication profile, wherein the first wireless communication profile defines a first protocol used for communication of packets;
    determining a packet error rate associated with the plurality of packets;
    comparing the packet error rate with a first set of packet error rate thresholds defined for the first protocol and associated with the first wireless communication profile, if it is determined that the wireless communication profile is the first wireless communication profile;
    changing one or more packet transmission parameters associated with additional packets to be received based on the first protocol from the second wireless network device based at least in part on results of said comparing the packet error rate with the first set of packet error rate thresholds;
    comparing the packet error rate with a second set of packet error rate thresholds defined for a second protocol and associated with a second wireless communication profile used for communication of the packets, if it is determined that the wireless communication profile is not the first wireless communication profile; and
    changing the one or more packet transmission parameters associated with the additional packets to be received based on the second protocol from the second wireless network device based at least in part on results of said comparing the packet error rate with the second set of packet error rate thresholds, wherein the first set of packet error rate thresholds are associated with a first combination of a packet transmit rate and a first slot duration for the first wireless communication profile, wherein the second set of packet error rate thresholds are associated with a second combination of a second packet transmit rate and a second slot duration for the second wireless communication profile.

2. The method of claim 1, wherein said comparing the packet error rate with the first set of packet error rate thresholds comprises comparing the packet error rate to a lower limit packet error rate threshold and to an upper limit packet error rate threshold.

3. The method of claim 2, wherein said changing the one or more packet transmission parameters associated with the additional packets to be received based on the first protocol comprises:
    if the packet error rate is greater than the upper limit packet error rate threshold, decreasing a packet transmit rate by a first pre-defined transmit rate amount; and
    if the packet error rate is less than the lower limit packet error rate threshold, increasing the packet transmit rate by a second pre-defined transmit rate amount.

4. The method of claim 2, wherein said changing the one or more packet transmission parameters associated with the additional packets to be received based on the first protocol comprises:
    if the packet error rate is greater than the upper limit packet error rate threshold, decreasing one of a packet transmit rate by a first pre-defined transmit rate amount or a slot duration by a first pre-defined slot duration value;
    if the packet error rate is less than the lower limit packet error rate threshold, increasing one of the packet transmit rate by a second pre-defined transmit rate amount or the slot duration by a second pre-defined slot duration value.

5. The method of claim 1, wherein said determining the packet error rate comprises one of determining the packet error rate received within a predefined time interval or determining the packet error rate associated with a predefined number packets.

6. The method of claim 1, wherein said determining whether the wireless communication profile is the first wireless communication profile further comprises determining that a communication protocol implemented on a communication link between the first wireless network device and the second wireless network device is an Object Exchange (OBEX) and a Radio Frequency Communication (RF-COMM) protocol.

7. The method of claim 1, wherein the first and the second set of packet error rate thresholds comprise an upper limit threshold for a long term packet error rate, a lower limit threshold for the long term packet error rate, an upper limit threshold for a short term packet error rate, and a lower limit threshold for the short term packet error rate.

8. The method of claim 1, wherein said determining whether the wireless communication profile is the first wireless communication profile further comprises at least one member of a group consisting of receiving an indication of the first wireless communication profile from a host device on which the first wireless network device is located, detecting packets exchanged during setup of a communication link between the first wireless network device and the second wireless network device, and receiving the indication of the first wireless communication profile from an application-programming interface (API) of the first wireless communication profile.

9. The method of claim 1, wherein said changing the one or more packet transmission parameters associated with the additional packets to be received based on the first protocol comprises:
    changing a transmit power level associated with the additional packets based at least in part on the results of said comparing the packet error rate with the first set of packet error rate thresholds.

10. The method of claim 9, further comprising:
changing the transmit power level associated with the additional packets based at least in part on the results of said comparing the packet error rate with the second set of packet error rate thresholds.

11. The method of claim 1, wherein the first wireless network device and the second wireless network device are devices that implement Bluetooth protocols.

12. The method of claim 1, further comprising:
determining a performance indicator associated with the plurality of packets received at the first wireless network device;
comparing the performance indicator against a performance indicator threshold associated with the first wireless communication profile, if it is determined that the wireless communication profile is the first wireless communication profile;
implementing one or more reliability tests defined for the first protocol associated with the first wireless communication profile, based at least in part on said comparing the performance indicator against the performance indicator threshold associated with the first wireless communication profile;
determining whether the plurality of packets pass the one or more reliability tests;
if it is determined that the plurality of packets pass the one or more reliability tests, processing the plurality of packets; and
if it is determined that the plurality of packets do not pass the one or more reliability tests, requesting retransmission of the plurality of packets.

13. The method of claim 1,
wherein the first wireless communication profile is defined to perform a lesser number of reliability checks than the second wireless communication profile,
wherein the reliability checks validate that the plurality of packets are uncorrupted during transmission between the first wireless network device and the second wireless network device, and
wherein values of the first set of packet error rate thresholds are less than values of the second set of packet error rate thresholds.

14. The method of claim 13,
wherein the first wireless communication profile is defined to perform a reliability check at a physical layer and is defined to not perform the reliability check at layers higher than the physical layer, and
wherein the second wireless communication profile is defined to perform the reliability check at the physical layer and is defined to perform the reliability check at layers higher than the physical layer.

15. A non-transitory machine-readable medium, having instructions stored therein, which when executed by one or more processors causes the one or more processors to perform operations that comprise:
determining, by a first wireless network device, whether a wireless communication profile associated with a plurality of packets received from a second wireless network device, is a first wireless communication profile, wherein the first wireless communication profile defines a first protocol used for communication of packets;
determining a packet error rate associated with the plurality of packets;
comparing the packet error rate with a first set of packet error rate thresholds defined for the first protocol and associated with the first wireless communication profile, if it is determined that the wireless communication profile is the first wireless communication profile;
changing one or more packet transmission parameters associated with additional packets to be received based on the first protocol from the second wireless network device based at least in part on results of said comparing the packet error rate with the first set of packet error rate thresholds;
comparing the packet error rate with a second set of packet error rate thresholds defined for a second protocol and associated with a second wireless communication profile used for communication of the packets, if it is determined that the wireless communication profile is not the first wireless communication profile; and
determining to change the one or more packet transmission parameters associated with the additional packets to be received based on the second protocol from the second wireless network device based at least in part on results of said comparing the packet error rate with the second set of packet error rate thresholds, wherein the first set of packet error rate thresholds are associated with a first combination of a packet transmit rate and a first slot duration for the first wireless communication profile, wherein the second set of packet error rate thresholds are associated with a second combination of a second packet transmit rate and a second slot duration for the second wireless communication profile.

16. The non-transitory machine-readable medium of claim 15, wherein said operation of comparing the packet error rate with the first set of packet error rate thresholds comprises comparing the packet error rate to a lower limit packet error rate threshold and to an upper limit packet error rate threshold.

17. The non-transitory machine-readable medium of claim 16, wherein said operation of changing the one or more packet transmission parameters associated with the additional packets to be received based on the first protocol comprises:
if the packet error rate is greater than the upper limit packet error rate threshold, decreasing a packet transmit rate by a first pre-defined transmit rate amount; and
if the packet error rate is less than the lower limit packet error rate threshold, increasing the packet transmit rate by a second pre-defined transmit rate amount.

18. The non-transitory machine-readable medium of claim 16, wherein said operation of changing the one or more packet transmission parameters associated with the additional packets to be received based on the first protocol comprises:
if the packet error rate is greater than the upper limit packet error rate threshold, decreasing one of a packet transmit rate by a first pre-defined transmit rate amount or a slot duration by a first pre-defined slot duration value; and
if the packet error rate is less than the lower limit packet error rate threshold, increasing one of the packet transmit rate by a second pre-defined transmit rate amount or the slot duration by a second pre-defined slot duration value.

19. The non-transitory machine-readable medium of claim 15, wherein said operation of changing the one or more packet transmission parameters associated with the additional packets to be received based on the first protocol comprises:
changing a transmit power level associated with the additional packets based at least in part on the results of said comparing the packet error rate with the first set of packet error rate thresholds.

20. The non-transitory machine-readable medium of claim 19, wherein the operations further comprise:
changing the transmit power level associated with the additional packets based at least in part on the results of said comparing the packet error rate with the second set of packet error rate thresholds.

21. The non-transitory machine-readable medium of claim 15,
wherein the first wireless communication profile is defined to perform a lesser number of reliability checks than the second wireless communication profile,
wherein the reliability checks validate that the plurality of packets are uncorrupted during transmission between the first wireless network device and the second wireless network device, and
wherein values of the first set of packet error rate thresholds are less than values of the second set of packet error rate thresholds.

22. The non-transitory machine-readable mediums of claim 21,
wherein the first wireless communication profile is defined to perform a reliability check at a physical layer and is defined to not perform the reliability check at layers higher than the physical layer, and
wherein the second wireless communication profile is defined to perform the reliability check at the physical layer and is defined to perform the reliability check at layers higher than the physical layer.

23. A first wireless network device comprising:
a profile detection unit operable to determine whether a wireless communication profile associated with a plurality of packets received from a second wireless network device is a first wireless communication profile, wherein the first wireless communication profile defines a first protocol used for communication of packets; and
a transmit rate selection unit operable to:
determine a packet error rate associated with the plurality of packets received at the first wireless network device;
compare the packet error rate with a first set of packet error rate thresholds defined for the first protocol and associated with the first wireless communication profile, if it is determined that the wireless communication profile is the first wireless communication profile;
change one or more packet transmission parameters associated with additional packets received based on the first protocol from the second wireless network device based at least in part on results of the transmit rate selection unit compare of the packet error rate with the first set of packet error rate thresholds;
compare the packet error rate with a second set of packet error rate thresholds defined for a second protocol and associated with a second wireless communication profile used for communication of the packets, if it is determined that the wireless communication profile is not the first wireless communication profile; and
change the one or more packet transmission parameters associated with the additional packets to be received based on the second protocol from the second wireless network device based at least in part on results of said compare of the packet error rate with the second set of packet error rate thresholds, wherein the first set of packet error rate thresholds are associated with a first combination of a packet transmit rate and a first slot duration for the first wireless communication profile, wherein the second set of packet error rate thresholds are associated with a second combination of a second packet transmit rate and a second slot duration for the second wireless communication profile.

24. The first wireless network device of claim 23, wherein the transmit rate selection unit operable to change the one or more packet transmission parameters associated with the additional packets to be received based on the first protocol comprises the transmit rate selection unit operable to:
decrease a packet transmit rate by a first pre-defined transmit rate amount, if the packet error rate is greater than an upper limit packet error rate threshold associated with the first wireless communication profile; and
increase the packet transmit rate by a second pre-defined transmit rate amount, if the packet error rate is less than a lower limit packet error rate threshold associated with the first wireless communication profile.

25. The first wireless network device of claim 23, wherein the transmit rate selection unit operable to change the one or more packet transmission parameters associated with the additional packets to be received based on the first protocol comprises the transmit rate selection unit operable to:
decrease one of a packet transmit rate by a first pre-defined transmit rate amount or a slot duration by a first pre-defined slot duration value, if the packet error rate is greater than an upper limit packet error rate threshold; and
increase one of the packet transmit rate by a second pre-defined transmit rate amount or the slot duration by a second pre-defined slot duration value, if the packet error rate is less than a lower limit packet error rate threshold.

26. The first wireless network device of claim 23, further comprising:
a power management unit operable to:
change a transmit power level associated with the additional packets based at least in part on the results of the compare of the packet error rate with the first set of packet error rate thresholds.

27. The first wireless network device of claim 26, wherein the power management unit is operable to:
change the transmit power level associated with the additional packets based at least in part on the results of the compare of the packet error rate with the second set of packet error rate thresholds.

28. The first wireless network device of claim 23,
wherein the first wireless communication profile is defined to perform a lesser number of reliability checks than the second wireless communication profile,
wherein the reliability checks validate that the plurality of packets are uncorrupted during transmission between the first wireless network device and the second wireless network device, and
wherein values of the first set of packet error rate thresholds are less than values of the second set of packet error rate thresholds.

29. The first wireless network device of claim 28,
wherein the first wireless communication profile is defined to perform a reliability check at a physical layer and is defined to not perform the reliability check at layers higher than the physical layer, and
wherein the second wireless communication profile is defined to perform the reliability check at the physical layer and is defined to perform the reliability check at layers higher than the physical layer.

30. A method for communication comprising:
determining, by a first wireless network device, that a wireless communication profile associated with a plurality of packets received from a second wireless network device, is a first wireless communication profile, wherein the first wireless communication profile defines a first protocol used for communication of packets;

determining a packet error rate associated with the plurality of packets received at the first wireless network device;

comparing the packet error rate with a first set of packet error rate thresholds defined for the first protocol and associated with the first wireless communication profile;

determining whether to change one or more packet transmission parameters associated with additional packets to be received based on the first protocol from the second wireless network device based at least in part on results of said comparing the packet error rate with the first set of packet error rate thresholds;

determining a performance indicator associated with the plurality of packets;

comparing the performance indicator against a performance indicator threshold defined for the first protocol; and determining whether the plurality of packets pass one or more reliability tests defined for the first protocol, based at least in part on said comparing the performance indicator against the performance indicator threshold defined for the first protocol, wherein the first wireless communication profile is defined to perform a lesser number of reliability checks than a second wireless communication profile, wherein the reliability checks validate that the plurality of packets are uncorrupted during transmission between the first wireless network device and the second wireless network device.

31. The method of claim 30, further comprising:
if it is determined that the plurality of packets pass the one or more reliability tests, processing the plurality of packets; and
if it is determined that the plurality of packets do not pass the one or more reliability tests, requesting retransmission of the plurality of packets.

32. The method of claim 30,
wherein values of the first set of packet error rate thresholds are less than values of a second set of packet error rate thresholds associated with the second wireless communication profile.

33. The method of claim 32,
wherein the first wireless communication profile is defined to perform a reliability check at a physical layer and is defined to not perform the reliability check at layers higher than the physical layer, and
wherein the second wireless communication profile is defined to perform the reliability check at the physical layer and is defined to perform the reliability check at layers higher than the physical layer.

* * * * *